INVENTORS
John L. MORE
John B. EATON

April 7, 1970 J. B. EATON ET AL 3,504,793
VIBRATORY SEPARATOR CONSTRUCTION
Filed Aug. 4, 1967 3 Sheets-Sheet 2

INVENTORS
John L. MORE
John B. EATON

ATTORNEYS

April 7, 1970  J. B. EATON ET AL  3,504,793
VIBRATORY SEPARATOR CONSTRUCTION

Filed Aug. 4, 1967  3 Sheets-Sheet 3

INVENTORS
John L. MORE
John B. EATON

ATTORNEYS

United States Patent Office 3,504,793
Patented Apr. 7, 1970

3,504,793
VIBRATORY SEPARATOR CONSTRUCTION
John B. Eaton, Westhill, Ontario, and John L. More,
Montreal, Quebec, Canada, assignors to Separator Engineering Ltd., Montreal, Quebec, Canada
Filed Aug. 4, 1967, Ser. No. 658,470
Int. Cl. B07b *13/16, 1/28*
U.S. Cl. 209—255                                    15 Claims

ABSTRACT OF THE DISCLOSURE

The disclosure relates to the construction of vibratory separators employing screens through which fine material is caused to pass while the coarse material is retained upon the screen. More in particular the disclosure relates to a frame unit for a vibratory separator. The frame unit includes a wall of circular cross-section having upper and lower rims, a collector plate having at least one portion sloping downwardly to a lower edge which contacts the wall, an outlet in the wall immediately above the lower edge, and trough means extending outwardly from and around the entire periphery of the wall and sloping downwardly from one or more points at or below the level of the upper rim and terminating in discharge means.

FIELD OF THE INVENTION

The present invention relates to the construction of vibratory separators employing screens through which fine material is caused to pass while the coarse material is retained upon the screen. In known separators of this kind, the coarse material is caused to move in a generally outward direction for discharge at the outer edge of the screen. Conventionally, a gyratory and oscillatory tilting motion is imparted to the screen and the casing to which it is attached by means of a motor mounted to the casing and provided with eccentric weights on its shaft. Under the vibration so imposed, the coarse material travels in a spiral path across the upper surface of the screen and moves around the edges of the screen until it encounters a discharge spout, whereupon it is ejected.

DESCRIPTION OF THE PRIOR ART

In vibratory separators of the kind referred to it is conventional to mount a series of frame units in vertical succession upon a base unit which incorporates the vibrator. The frame units have upper and lower circular flanges and the adjacent flanges of successive units are held together by clamping rings, the base unit being provided with a similar flange, rigid with the motor, and resiliently supported upon a fixed base so that the entire stack of frame units is vibrated together.

For the discharge of the fine component material which passes through the screen, it is conventional to employ a lower frame unit in which is mounted a collector plate which has at least a portion sloping downwardly towards a discharge spout mounted in the wall of the lower unit.

It will be apparent that to obtain controlled discharge of both coarse and fine materials in accordance with the separators described above, it is necessary to use two separate frame units mounted one above the other. If more than one separation is desired upon the same separator, each involving the use of two separate vertically spaced screens with separate discharge means, it will be apparent that a considerable number of frame units are required to be mounted in the same vertical stack. This is undesirable in that it results in a clumsy, top-heavy construction and due to the increased inertia or mass to be vibrated, results in a drop in efficiency.

SUMMARY OF THE INVENTION

It is accordingly an object of the present invention to provide an improved form of construction for vibrators of the kind described in which the number of frame units require is reduced from the same result.

It is another object of the present invention to provide an improved form of construction which both reduces the mass of the baffle retaining means, increases the rigidity of the mounting and allows unimpeded flow of coarse effluent into the collecting trough.

In accordance with one form of the invention there is provided a frame unit for a vibratory separator comprising: a wall of circular cross-section having upper and lower rims, at least one portion of said plate being downwardly sloping to a lower edge which makes contact with said wall, an outlet in said wall immediately above said lower edge, and trough means extending outwardly from and around the entire periphery of said wall and sloping downwardly from one or more points at or below the level of said upper rim and terminating in discharge means.

The above form of construction in accordance with the present invention combines the functions of the coarse discharge frame unit and fine discharge frame unit in a single frame unit of not greater than conventional size and, therefore, reduces the weight and height of the resulting separator and providing a more compact and efficient device.

In a preferred embodiment of the invention, the frame unit further comprises a plurality of generally U-shaped brackets having a lower limb mounted to said wall and extending outwardly therefrom, a vertical extending web, and an upper limb extending inwardly to at least approximately the level of said wall, said brackets extending around said trough means, and an upper frame upwardly spaced from said first rim and concentric therewith, said second frame being mounted to and supported by said upper limbs.

Preferably the second frame is of substantially lesser height than the wall of the first mentioned frame unit, and may, for example, be less than half of that height. It will be apparent that, when the second frame is used to retain the baffle sleeve, the latter form of construction allows the unimpeded passage of coarse effluent under the second frame all around the separator, reduces the weight of the baffle retaining means and provides it with a rigid mounting.

BRIEF DESCRIPTION OF THE DRAWINGS

Having thus generally described the invention, preferred embodiments thereof are hereafter described in greater detail with reference to the accompanying drawings in which.

DESCRIPTION OF THE PREFERRED EMBODIMENT

Figure 1:
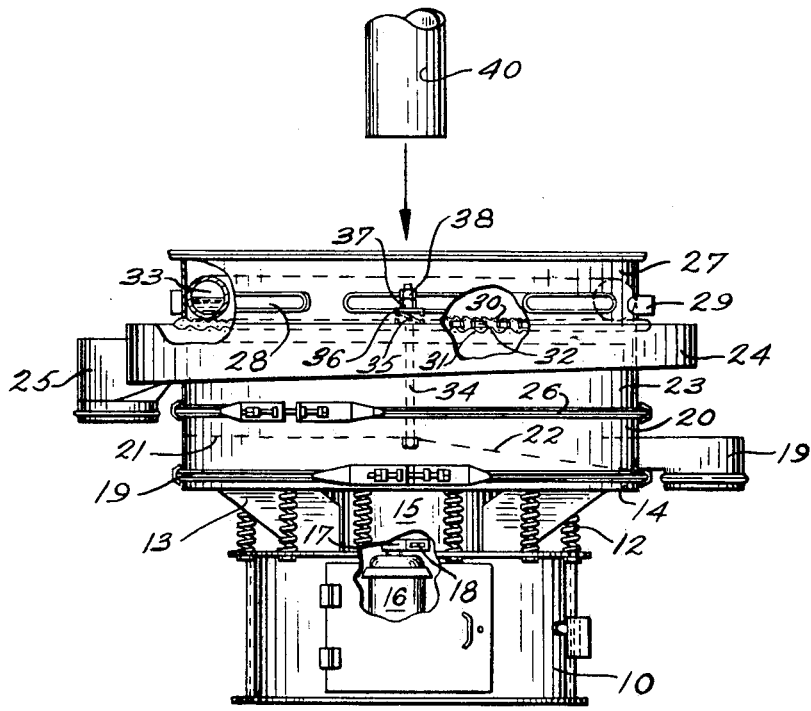
FIG. 1 is a front vertical elevational view, provided for comparison purposes and not in accordance with the invention, of a vibratory separator particularly suitable for use in the clarification of pulp mill effluent or other industrial effluent and embodying a stacked arrangement of frame units.

In the drawings, in which like elements in the figures are given the same numeral, reference is first made to FIG. 1, which shows a separator having a form of construction not in accordance with the invention. The separator of FIG. 1 includes a stationary cylindrical base 10 and a circular bottom plate 14, the bottom plate being mounted on the base by means of a plurality of springs 12 which permit the bottom plate and components rigid therewith to "float" with respect to the base 10. The bottom 14 is secured so as to be rigid with a motor enclosure 15. An electric motor 16 is mounted rigidly to the enclosure 15 by conventional means. The motor shaft extends at the upper and lower ends of the motor, only the upper shaft being shown and eccentric weights 18 are mounted to the upper and lower extensions in any desired manner so as to be adjustable in lead and magnitude. Webs 13 interconnect the bottom 14 with the motor enclosure 15 to impart additional rigidity to the structure. It will be apparent that due to the resilient mounting of the motor enclosure and the bottom, the eccentric weights cause a gyratory and oscillatory tilting motion of the bottom and anything supported thereby.

Mounted to the bottom plate 14 by means of a clamping ring 19, which encircles complementary flanges on the respective components, is a fine-discharge frame 20. This comprises a deflector plate 21 having a portion 22 sloped downwardly towards a discharge spout 19 in the wall of the frame. Frame 20 is mounted by means of a similar upper flange to the lower flange of a coarse discharge frame 23, the flanges being gripped by clamping ring 26. The frame 23 is of the type further described in the said copending application Ser. No. 968,593, and comprises a trough 24 extending entirely around the periphery of the frame below the upper edge and adapted to collect coarse material discharged over the upper edge of the frame and to feed it in a spiral downward path to a discharge spout 25.

An upper flange on frame 23 is clamped by a further clamping ring not shown to the lower flange of a baffle retaining frame 27. The frame 27 includes a plurality of circumferential distributed elongate apertures 28, surrounded by discharge spouts 29 which lead material retained within the frame over the clamped flanges of frames 27 and 23 into the trough 24.

Sandwiched between the flanges of frames 23 and 27 is a twin screen unit with an anti-blinding device. This arrangement includes a separator screen 30, having mounted below it a support screen 31 having larger apertures and arranged to support a plurality of anti-blinding rings 32. The function of the anti-blinding rings is to impart a combination of impacting and shearing movements against the lower edge of the separator screen 30, to shear off and shake off particles of matter imbedded in the meshes of the separator screen 30 and impeding the proper screening action.

Supported upon the separator screen 30 is an inflated baffle 33 formed of a toroidal sleeve of, for example, synthetic plastic material which is permanently filled to the level indicated with a material such as water which is capable of flowing within the baffle. The function of the baffle weighted by the material therein is to restrict the outward flow of liquid while permitting solid material retained upon the screen to pass underneath and out through the orifices 28.

The screens 30 and 31 are tied down under tension to the deflector plate 22 by means of a tie-down bolt 34 welded to the deflector plate 22 and passing through the screens. The screens are held apart around the bolt 34 by means of a spacer ring and the upper screen is held down by means of a compression spring 35 held between cup shaped washers 36 by an adjustable tensioning nut 37 and a lock nut 38.

In the operation of the device of FIG. 1, industrial effluent containing, for example, water and wood particles which it is required to separate, is passed through the spout 40 to the separator screen 30 within the toroidal baffle 33. The vibrator is caused to shake all the frame units together and this results in the fine effluent, which may be merely water passing through the screens 30 and 31 and being deflected by deflector plate 22 to the discharge spout 19, while the solid wood particles constituting, for example, the coarse effluent, pass under the inflated toroidal baffle 33, through the spouts 29 and are collected by the trough 24 which in turn feeds them downwardly to discharge spout 25. At the same time the anti-blinding rings 32 act to maintain the separator screen 33 free of blocked particles.

Figure 2:
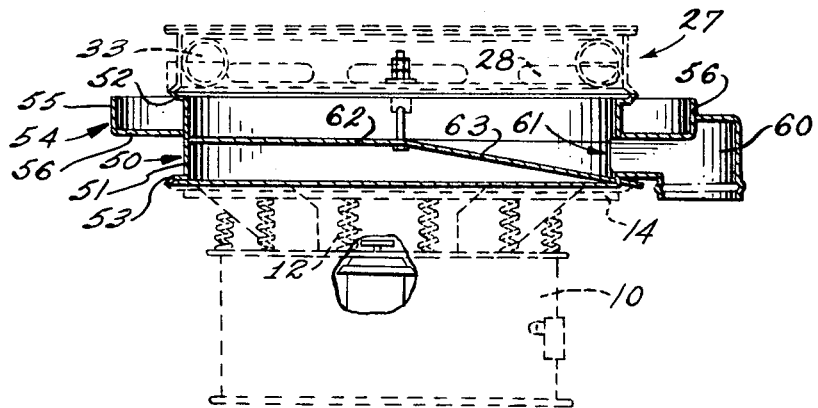
FIG. 2 is a vertical cross-sectional view of a frame unit in accordance with the invention, viewed as at line 2—2 of FIG. 3, showing in dotted lines the arrangement of the additional components of the separator adapted to give the same function as the separator of FIG. 1.

Referring now to FIG. 2, there is shown a separator adapted to perform the same functions as that of FIG. 1 and which has a vibrating means as shown in FIG. 1. It will be apparent immediately that the separator is of substantially more compact construction. The base unit shown in dotted lines and comprising the same parts, i.e. fixed base 10, bottom plate 14 and springs 12 together with the motor and eccentric weights which are not shown is mounted to a frame unit 50 of novel construction and in accordance with the invention.

Figure 3:
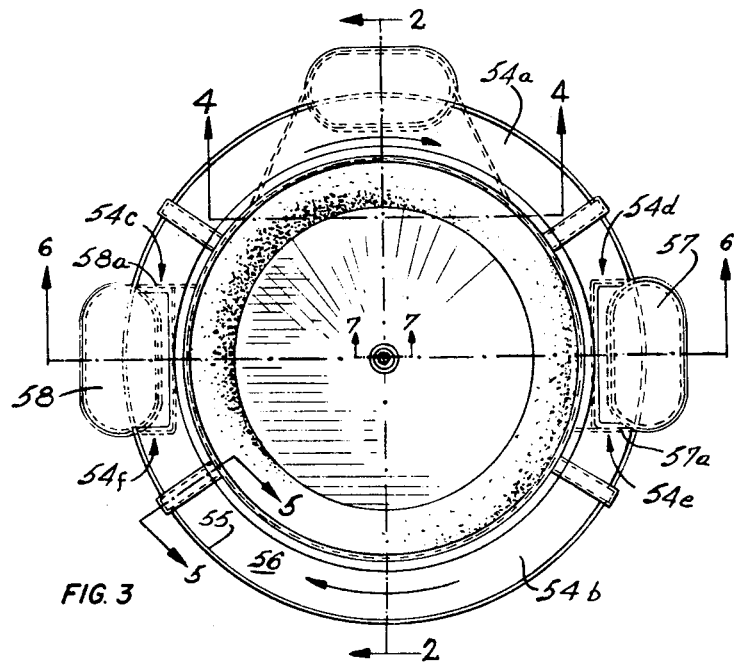
FIG. 3 is a plan view of a modification of the frame unit of FIG. 2 showing also the provision of an inflated baffle.
Figure 4:
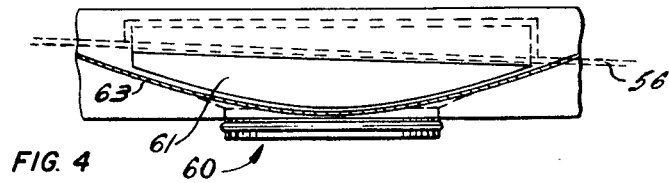
FIG. 4 is a vertical cross-section along the line 4—4 of FIG. 3, to a slightly enlarged scale.
Figures 5, 5A:
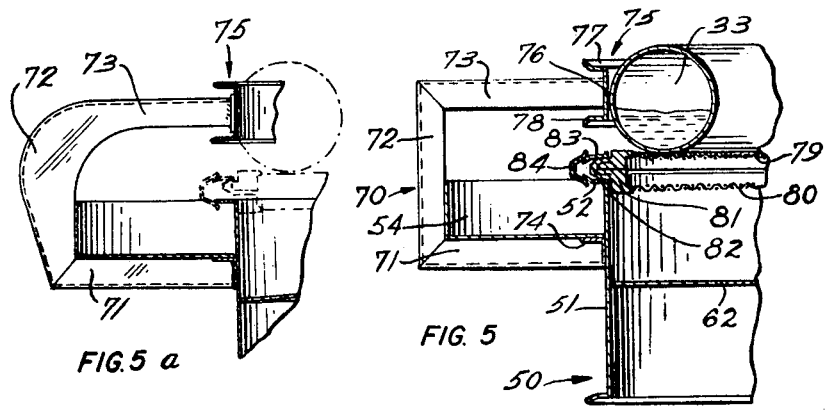
FIG. 5 is a vertical cross-sectional view along the line 5—5 of FIG. 3 to a greatly enlarged scale.
FIG. 5a shows a modified bracket construction.

In considering the frame unit 50 of FIG. 2, reference may also be made to FIGS. 3, 4 and 5 which show an identical unit 50, to which, however, additional components have been added as will become apparent.

The frame 50 is generally circular in plan and includes a cylindrical wall 51 having upper and lower peripheral flanges 52 and 53, the flange 53 being mounted to the bottom of the plate 14 of the vibrator base. The upper flange is shown mounted to the baffle retaining frame 27 of FIG. 1, the latter being shown in dotted lines, the twin screens 30 and 31 being mounted between the frames 50 and 27 in conventional manner. The frame 50 combines the features of frames 23 and 27 of the embodiment of FIG. 1 as will become apparent.

Figure 6:
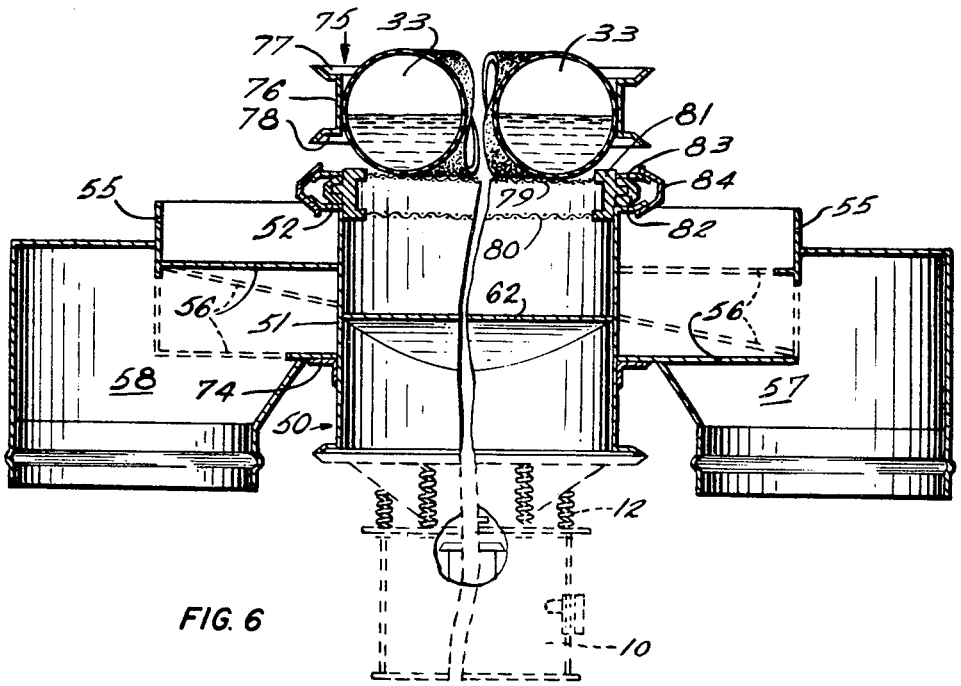
FIG. 6 is an enlarged vertical cross-section, partly cutaway, along the line 6—6 of FIG. 3.

To the outside surface of the wall 51 there is welded or otherwise secured a two-part trough 54, each part 54a and 54b extending over approximately half the peripheral extent frame. Each part of the two-part trough 54 includes a vertical wall 55 and a bottom wall 56, the bottom wall 56 sloping as will be described in more detail hereafter. At diametrically opposed locations on the frame, discharge spouts 57 and 58 are provided, these spouts communicating with the trough 54, and being open at the top where they join the trough parts 54a and 54b, so as to form a continuation of the trough. The trough part 54a has its end 54c secured to a vertical element 58a which forms one side wall of the spout 58, the part 54a sloping downwardly away from its end 54c throughout its length and through almost 180° until at its end 54d it adjoins the spout 57. This slope is further illustrated in FIGS. 4 and 6. The trough part 54a opens at its lower end into the spout 57 as shown in FIG. 6 so that material sliding under the influence of the vibrations of the separator, passes downwardly along the trough part 54a and is discharged through the spout 57.

The trough part 54b has its highest end 54e attached to the side wall member 57a of spout 57 and its lower end 54f opens into the spout 58, the trough portion 54b sloping downwardly throughout its length from spout 57 to spout 58.

As shown in FIG. 2, a fine materials discharge spout 60 is provided in the wall of the frame 50 at a position at right angles to a line diametrically connecting the center lines of the spouts 57 and 58. The floor 56 of the trough portion 54a is let into the top of the spout 60 as shown more clearly in FIGS. 2 and 4, so that the discharge opening 61, which is formed under the level of the floor 56, has a sloping upper limit as shown in FIG. 4.

Mounted within the frame unit 50 is a deflecting plate 62, similar to the deflecting plate of 21 of FIG. 1, which is secured at its edges to the inside of wall 51. The deflector plate 60 has a portion 63 which as shown more clearly in FIG. 4 slopes downwardly and forms the lower extremity of the discharge spout opening 61.

The tie-down bolt may be formed similarly to that shown at 34 in FIG. 1 or may have the preferred form of construction described hereinafter with reference to FIGS. 3 to 7.

It will be apparent from a comparison of FIGS. 1 and 2 that the unit of FIG. 2 will function in exactly the same way as that of FIG. 1, while providing a substantially lighter and more compact construction leading to greater convenience and higher efficiency and enabling more units to be provided, for example, for a two-step or three-step separation in the same unit.

FIGS. 3 to 7 show a frame unit similar to the frame unit 50 of FIG. 2, provided with means integral therewith for retaining an inflated baffle similar to that shown at 33 in FIGS. 1 and 2.

The baffle retaining means takes the form of a number, for example 4, as shown, of generally U-shaped brackets 70 (FIGS. 5 and 5a) which have lower limbs 71 mounted exteriorly to the wall 51 of the frame unit 50, vertically extending webs 72 and upper limbs 73 extending inwardly to approximately the level of the wall 51. As shown, the brackets 70 are of hollow rectangular section and may be made, for example, of welded lengths of angle iron as in FIG. 5 or from welded sheet to obtain the more rugged shape shown in FIG. 5a. The lower limbs 71 are welded to brackets 74 which are in turn welded to wall 51, so as to provide a rigid union. As shown in FIG. 5 the lower limbs 71 pass under the trough 54, and preferably the limbs 71 and webs 72 abut and support the respective adjacent floor and outer wall of the trough 54. A baffle retaining frame 75 is mounted to the upper limb 73 of the bracket preferably as shown with its cylindrical wall 76 aligned with wall 51 of the frame unit. The outer surface of the wall 76 is welded at an approximately central region to the ends of the upper limbs 73 of U-shaped brackets. The frame 75 is of substantially less height than that of the frame unit 51, being, for example, as shown, less than half the height of the wall 51. The frame 75 is provided with upper and lower flanges 77 and 78 to give added strength and the upper flange 77 may also be utilized for supporting additional frame units if desired.

To illustrate the operation of the frame unit shown in FIGS. 3 to 7, the latter is shown fitted with a separator screen and inflated baffle and vibrating means as shown in FIGS. 1 and 2. As shown, for example, in FIG. 5, the screen is of the twin screen type illustrated in FIG. 1 and further described in said copending application Ser. No. 968,594. The deflector screen 79 and support screen 80 are mounted at their rims to conventional plastic collars assembled together to form a rim support 81 having a projecting flange 82. The flange 82 rests on the upper flange 52 of the frame unit 50 and is covered by a collar 83, the collar 83 and flange 52 being clamped together by a clamping ring 84. It will be appreciated that a single screen may be clamped to the flange by conventional means if desired.

The inflated baffle 33 rests upon the upper screen 79 as shown in FIG. 5 and is confined by wall 76 of the upper frame 75. As shown, the baffle 33 and frame 75 are preferably arranged to cooperate so that the maximum diameter of the baffle sleeve 33 meets the wall 76 at approximtaely centrally of its height.

Figure 7:
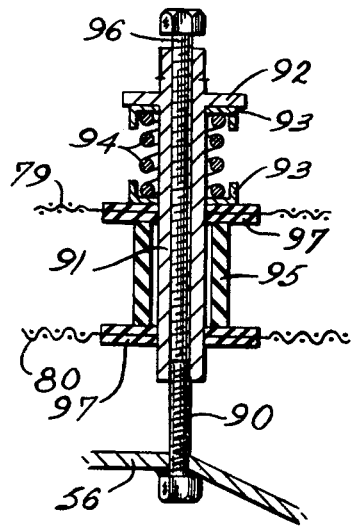
FIG. 7 is a greatly enlarged cross-sectional view along the line 7—7 of FIG. 3, illustrating the tie-down means for the screen.

The tie-down utilized in the embodiment of FIGS. 3 to 6 is best shown in FIG. 7. The tie-down bolt 90 is welded to the deflector plate 56 as in the embodiment of FIG. 1, but is of substantially shorter height, terminating short of the level of the upper flange 52 to which the separator screen or screens are mounted. An internally threaded extension sleeve 91 is passed through central apertures in the separator screen 79 and support screen 80, which may be reinforced in the vicinity of the aperture by embedment in collars 97 of a synthetic plastic material. The extension sleeve 91 is screwed down upon the tie-down bolt 90. The sleeve 91 is provided with an integral flange 92 and between the flange 92 and the separator screen 79 are provided a pair of cup shaped washers 93 enclosing a compression spring 94. The extension sleeve 91 is therefore, screwed down upon the bolt 90 to tension the screens downwardly at their center, the screens being spaced apart by a spacer tube 95. As in the embodiment of FIG. 1 a plurality of anti-baffle rings 32 are provided in the space between the screen 79 and 80 for purposes already described. In order to lock the extension sleeve 91 in place a lock bolt 96 is screwed down until it meets the bolt 90.

The form of construction as shown in FIG. 7 allows ready removal of the screen unit formed of screen 79 and 80. The screen unit cannot be lifted vertically due to the presence of the upper frame 75 and is, therefore, assembled and dismantled by sliding it in and out of place horizontally between the brackets and within the space between the frames 50 and 75 with the extension sleeve 91 removed. The sleeve 91 is, therefore, engaged after positioning of the screen unit in place and is removed prior to dismantling of the screen unit.

It will be apparent that when the frame unit 50 of FIGS. 5 to 7 is fitted in place over a base unit 10 as shown in dotted lines in FIG. 6, the resulting unit will function similarly to that of FIG. 2, but with a number of improvements. The assembled separator is again of more compact, more rigid and lighter construction due to the small frame 75 and its rigid mounting. At the same time, the function is more efficient in that effluent solids are free to pass under the baffle 33 at all points around the separator screen 79 and not merely through the apertures 28 used in the embodiments of FIGS. 1 and 2. Added rigidity is provided by the supporting action of the brackets 70 around the trough 54.

It will be apparent that many modifications may be made to the invention within the scope of the following claims. For example, if the form of construction in FIG. 2 is used, it is not necessary to employ the tie-down construction shown in FIG. 7 since the upper screen can be merely lifted off vertically. Furthermore, due to the slope in the trough 54, it is desired to use bracket 70 of standard construction, not all the brackets need be used to support the floor of the trough 54. Again, only a single spiral trough need be used together with a single discharge spout for the coarse effluent.

Also, frame 76 and baffle 33 may be of larger diameter so as to permit removal of the screen by lifting off, rather than by sliding out, bracket arm 73 being shortened correspondingly.

What is claimed is:
1. A frame unit for a vibratory separator comprising:
   a wall of circular cross-section having upper and lower rims,
   a separator screen supported by said upper rim and adapted to receive a material from which an effluent is to be separated by passing the effluent therethrough,
   a deflector plate mounted within said wall and extending thereacross between said rims,
   at least one portion of said plate being downwardly sloping to a lower edge thereof which makes contact with said wall, said deflector plate adapted to direct the effluent passing through said separator screen toward said lower edge thereof,
   an outlet in said wall immediately above said lower edge for receiving the effluent on said deflector plate directed toward said lower edge thereof, trough means facing upwardly and extending outwardly from and around the entire periphery of said wall and below the elevation of said screen and sloping downwardly from one or more points at or below the level of said upper rim to the termination thereof, a discharge means constituting the termination of said trough means, a baffle located on said screen and vibratable therewith wherein the material from which the effluent is separated by said screen may be directed to said trough means, vibrating means for vibrating said screen, said wall, said deflector plate, said baffle and said trough in unison whereby when the material containing the effluent is placed on said screen the effluent is directed through said screen onto said deflector plate to said outlet and the material from which the effluent is separated passes underneath said baffle to said trough means and to said discharge means thereof, a plurality of generally U-shaped brackets having a lower limb mounted to said wall and extending outwardly therefrom, a vertically extending web, and an upper limb extending inwardly toward said wall, and of approximately the same length as said lower limb, said brackets extending around said trough means, and an upper frame upwardly spaced from said first rim and concentric therewith, said upper frame being mounted to and supported by said upper limbs and retaining said baffle on said screen.

2. A frame unit as claimed in claim 1 wherein said upper frame comprises a flange at its upper rim adapted for securing to another frame unit having a complementary flange.

3. A frame unit as claimed in claim 1 wherein said lower rim of the first mentioned frame unit is formed with means adapted for mounting said unit to a vibrator base.

4. A frame unit as claimed in claim 1 wherein said brackets are of hollow rectangular cross-section.

5. A frame unit as claimed in claim 1 wherein said trough means includes one or more troughs each facing upwardly and comprising a floor portion extending outwardly from said wall, and an enclosing wall at the outer edge of said floor portion and wherein said limbs are horizontal and said web is vertical and wherein each said lower limb extends under a said trough so as to assist in supporting the latter.

6. A frame unit as claimed in claim 1, said first member frame unit including a pair of discharge spouts extending outwardly from said wall and having center lines at diametrically opposite locations adjacent said lower rim and spaced peripherally from the center line of said outlet, a pair of troughs constituting said trough means and each facing upwardly and extending from an upper end in communication with a said spout at one side thereof, downwardly and around said periphery to a lower end communicating with said other spout at the adjacent side thereof, said spouts being open upwardly to form a continuation of said trough means.

7. A frame unit as claimed in claim 1 wherein said lower rim of the first mentioned frame unit is formed with means adapted for mounting said unit to a vibrator base, said frame unit including a pair of discharge spouts extending outwardly from said wall and having center lines at diametrically opposite locations adjacent said lower rim and spaced peripherally from the center line of said outlet, a pair of troughs constituting said trough means and each facing upwardly and extending from an upper end in communication with a said spout at one side thereof, downwardly and around said periphery to a lower end communicating with said other spout at the adjacent side thereof, said spouts being open upwardly to form a continuation of said trough means, wherein said brackets are of hollow rectangular cross-section, and wherein said trough means includes one or more troughs each comprising a floor portion extending outwardly from said wall, and an enclosing wall at the outer edge of said floor portion and wherein said limbs are horizontal and said web is vertical and wherein each of said lower limbs extends under a said trough so as to assist in supporting the latter.

8. A frame unit as claimed in claim 1 further comprising a threaded rod secured to said deflector plate at the axis of said unit and extending axially upwards to a level at or below the level of said upper rim.

9. A frame unit as claimed in claim 1 with said screen being peripherally mounted to said upper rim and said frame unit further comprising:

tie-down means tensioning said separator screen at its center, said tie-down means including a threaded rod secured to said deflector plate at the axis of said unit and extending axially upwards to a level at or below the level of said upper rim, an extension sleeve internally threaded to engage said rod, said sleeve being adapted to pass through a central opening in said screen unit to screw on to said rod and having a flange adjacent its upper end, a compression spring retained between said flange and said screen, and a locking bolt, adapted to screw down through said sleeve to engage said rod after said sleeve is adjusted to provide the desired spring tension.

10. A frame unit for a vibratory separator comprising:

a wall of circular cross-section having upper and lower rims, a separator screen supported by said upper rim and adapted to receive a material from which an effluent is to be separated by passing the effluent therethrough, a deflector plate mounted within said wall and extending thereacross between said rims, at least one portion of said plate being downwardly sloping to a lower edge thereof which makes contact with said wall, said deflector plate adapted to direct the effluent passing through said separator screen toward said lower edge thereof, an outlet in said wall immediately above said lower edge for receiving the effluent on said deflector plate directed toward said lower edge thereof, trough means facing upwardly and extending outwardly from and around the entire periphery of said wall and below the elevation of said screen and sloping downwardly from one or more points at or below the level of said upper rim to the termination thereof, a discharge means constituting the termination of said trough means, a baffle located on said screen and vibratable therewith wherein the material from which the effluent is separated by said screen may be directed to said trough means, vibrating means for vibrating said screen, said wall, said deflector plate, said baffle and said trough in unison whereby when the material containing the effluent is placed on said screen the effluent is directed through said screen onto said deflector plate to said outlet and the material from which the effluent is separated passes underneath said baffle to said trough means and to said discharge means thereof, a plurality of generally U-shaped brackets having a lower limb mounted to said wall and extending outwardly therefrom, a vertically extending web, and an upper limb extending inwardly toward said wall and of approximately the same length as said lower limb, said brackets extending around said trough means, and an upper frame upwardly spaced from said first rim and concentric therewith, said upper frame being mounted to and supported by said upper limbs, wherein said upper frame is of substantially lesser height than said wall and said upper frame retaining said baffle on said screen.

11. A frame unit as claimed in claim 10 wherein said baffle includes an inflated flexible sleeve, at least partially filled with a material capable of flowing therein.

12. A frame unit as claimed in claim 11 wherein said sleeve is toroidal in shape and inflated to an internal pressure sufficient to render it self-supporting, said sleeve making contact with the inner surface of said upper frame at substantially the maximum diameter of said sleeve.

13. A frame unit as claimed in claim 12 wherein said lower rim of the first mentioned frame unit is formed with means adapted for mounting said unit to a vibrator base, said frame unit including a pair of discharge spouts extending outwardly from said wall and having center lines at diametrically opposite locations adjacent said lower rim and spaced peripherally from the center line of said outlet,
- a pair of troughs constituting said trough means and each facing upwardly and extending from an upper end in communication with a said spout at one side thereof, downwardly and around said periphery to a lower end communicating with said other spout at the adjacent side thereof,
- said spouts being open upwardly to form a continuation of said trough means,
- wherein said brackets are of hollow rectangular cross-section, and
- wherein said trough means includes one or more troughs each comprising a floor portion extending outwardly from said wall, and an enclosing wall at the outer edge of said floor portion and wherein said limbs are horizontal and said web is vertical and wherein each said lower limb extends under a said trough so as to assist in supporting the latter.

14. A vibratory separator having a base, a motor mounting resiliently supported upon said base,
- a motor mounted in said mounting and provided with one or more eccentric weights on its axle adapted to impart vibrations having gyratory and vibratory tilting components to said motor housing and anything rigidly mounted thereto, and at least one frame unit mounted so as to be rigid with said motor housing,
said frame unit comprising:
- a wall of circular cross-section having upper and lower rims,
- a deflector plate mounted within said wall and extending thereacross between said rims,
- at least one portion of said plate being downwardly sloping to a lower edge thereof which makes contact with said wall, said deflector plate adapted to direct the effluent of the separation toward said lower edge thereof,
- an outlet in said wall immediately above said lower edge for the effluent on said deflector plate directed toward said lower edge thereof,
- trough means facing upwardly and extending outwardly from and around the entire periphery of said wall and sloping downwardly from one or more points at or below the level of said upper rim to the termination thereof,
- and a screen unit including a separator screen extending across said frame unit, said screen unit being mounted to said upper rim,
- a plurality of generally U-shaped brackets having a lower limb mounted to said wall and extending outwardly therefrom, a vertically extending web, and an upper limb extending inwardly toward said wall and of approximately the same length as said lower limb,
- said brackets extending around said trough means, and
- an upper frame upwardly spaced from said first rim and concentric therewith, said upper frame being mounted to and supported by said upper limbs,
- a baffle for permitting the flow of solid material while inhibiting the flow of liquids, the baffle including an inflated flexible sleeve, at least partially filled with a material capable of flowing therein,
- said baffle resting on said screen and being retained from radial displacement by said upper frame, and
- tie-down means tensioning said separator screen at its center, said tie-down means comprising separate components including a threaded rod secured to said deflector plate at the axis of said unit and extending axially upwards to a level at or below the level of said upper rim.

15. A vibratory separator as claimed in claim 14 wherein said upper frame is of less than half the height of said wall.

References Cited

UNITED STATES PATENTS

| | | | |
|---|---|---|---|
| 279,286 | 6/1883 | Sutton | 209—350 X |
| 449,417 | 3/1891 | Hoyt | 209—350 |
| 1,170,893 | 2/1916 | Graham | 209—355 |
| 1,730,435 | 10/1929 | Munro | 209—315 X |
| 1,979,500 | 11/1934 | Sniffin | 209—350 X |
| 2,777,578 | 1/1957 | Miller | 209—243 |
| 3,158,568 | 11/1964 | Holman | 209—403 X |
| 3,257,040 | 6/1966 | Dumbaugh | 209—315 X |
| 2,676,706 | 4/1954 | Temple | 209—332 X |
| 3,047,151 | 7/1962 | Hurst | 209—332 X |
| 824,998 | 7/1906 | Monger | 209—315 X |
| 2,563,249 | 8/1951 | Koziol | 209—270 |

FOREIGN PATENTS

| | | |
|---|---|---|
| 131,533 | 12/1899 | Germany. |
| 1,187,463 | 2/1965 | Germany. |
| 1,208,708 | 9/1959 | France. |

OTHER REFERENCES

Sweco Separators, March 1966, 210/388.

ROBERT HALPER, Assistant Examiner

HARRY B. THORNTON, Primary Examiner

U.S. Cl. X.R.

209—263, 317, 332, 409